United States Patent [19]

Peiser

[11] 4,116,821

[45] Sep. 26, 1978

[54] METHOD AND APPARATUS FOR PROCESSING A PETROLEUM PRODUCTION STREAM

[75] Inventor: Alfred M. Peiser, Rocky Hill, N.J.

[73] Assignee: Mobil Oil Corporation, New York, N.Y.

[21] Appl. No.: 844,010

[22] Filed: Oct. 20, 1977

Related U.S. Application Data

[63] Continuation-in-part of Ser. No. 709,488, Jul. 28, 1976, abandoned, which is a continuation-in-part of Ser. No. 684,507, May 7, 1976, abandoned.

[51] Int. Cl.² .............................................. C10G 7/00
[52] U.S. Cl. ...................................... 208/361; 55/43; 208/364; 208/365
[58] Field of Search ............... 208/351, 361, 364, 365; 55/43

[56] References Cited

U.S. PATENT DOCUMENTS

2,303,609  12/1942  Carney ................................. 208/351

OTHER PUBLICATIONS

Mitchell "The Chemical Engineer" June 1975, pp. 361–364.

*Primary Examiner*—Herbert Levine
*Attorney, Agent, or Firm*—C. A. Huggett; Drude Faulconer

[57] ABSTRACT

A method and apparatus for processing a petroleum production stream at a remote location, e.g., offshore platform, to produce a liquid product stream having a stabilized vapor pressure, and a gas product stream having a stabilized, low dew point temperature at high pressure. The production stream is flowed through four separation stages where gas is separated from the liquid stream. The handling of the gas and condensed liquids from each of the stages is such that the present flow sequence closely simulates that of a conventional distillation tower and operates almost exactly the same except the principal driving force for vapor boil-up is pressure drop instead of reboiler heat. "Reboiler" heat is also provided in the process by heating the condensed liquid stream before it is returned to the third separation stage and this, along with the control of the pressure of the fourth stage, controls the final vapor pressure of the liquid product stream. The present invention utilizes a minimum of equipment to provide good fractionating efficiency within practical horsepower limits and, by proper routing of the condensed liquids, eliminates the need of disposing of any third product streams from the process.

8 Claims, 3 Drawing Figures

FIG. I

METHOD AND APPARATUS FOR PROCESSING A PETROLEUM PRODUCTION STREAM

CROSS-REFERENCE TO RELATED APPLICATION

This is a continuation-in-part of application Ser. No. 709,488, filed July 28, 1976, which in turn is a continuation-in-part of application Ser. No. 684,507, filed May 7, 1976, and both now abandoned.

BACKGROUND OF THE INVENTION

The present invention relates to the processing of a petroleum production stream and more particularly relates to a method and apparatus for processing a production stream at a remote location, e.g., offshore platform, to produce stabilized liquid products having an established vapor pressure and gas products having a stabilized low dew point temperature at high pressure.

In producing petroleum from subsea deposits, it is common for the production stream to contain large quantities of gas which are commingled with the liquid products. This gas, which is comprised of lighter hydrocarbons, e.g., methane, ethane, etc., evolves out of the production stream as it undergoes temperature and/or pressure changes at the surface. Such an unstable stream of products may cause severe problems in storing and/or transporting the produced products unless the production stream is first processed to produce liquid products having a stabilized vapor pressure and gas products having a low dew point. For example, if the liquid products are to be temporarily stored at or near the production site or are to be off-loaded onto tankers, any evolving of gas after storing or loading can create severe safety hazards. Further, where either the liquid products or the gas products are to be transported by pipeline, evolving gas from liquid products or condensing liquid from gas products creates a two-phase flow condition in the pipeline which adds complexity and undesirable problems to the pumping requirements of the pipeline system. Therefore, the need for processing the production stream onsite to produce liquid products having a desired, stabilized vapor pressure and gas products with a sufficiently stabilized low dew point temperature has long been recognized.

The most severe processing requirement arise when the crude product is to be off-loaded onto tankers and the gas is to be transported by pipeline. In this case, a more highly stabilized crude product is required than in the case of pipeline shipment of crude. At the same time, substantial quantities of propane, butane, and pentane, rejected from the low dew point gas, must be carried in the crude.

Satisfactory stabilization of the crude in the face of this condition imposed by the gas demands extremely high selectivity in the distribution of these components in the two products.

Certain considerations must enter into the design of a production processing operation which is to be carried out at an offshore location which are not normally involved in land-based operation. As recognized in the article, "Process Engineering on Offshore Production Platforms" by J. H. Mitchell, THE CHEMICAL ENGINEER, June 1975, pp. 361-364, it is desirable to minimize the number of pieces of processing equipment on the offshore platform since installation techniques, space, shape, and weight limitations all impose restrictions not usually present when designing a land-based operation.

The aforesaid article provides useful insights into means for producing a stable liquid product from an offshore platform. One approach described therein is to use a minimum number of flash separators, e.g., two, which would allow acceptable production rates and still provide the required amount of gas separation from the flow stream. However, the article points out that the power requirements for gas recompression in this approach are considered excessive. Another process discussed in the article involves combining a stabilizer tower having only a few trays with two or three flash separators to improve the rejection of methane and ethane while allowing more butane and propane to remain in the liquid products. However, as recognized, stabilizer towers require substantial heating, cooling, and heat exchange equipment which go against the original goal of reducing the amount of equipment on the platform.

Still another process is proposed (see FIG. 3 in the aforesaid article) where the production stream has a relatively high pressure which is often the case with offshore production. This approach is based on using the heat from the flow stream and not precooling prior to the first flash separator stage. The flow is processed through three additional flash stages which provide a good combination of heat economy, minimum equipment, and moderate horsepower requirements in the recompression train. When dew point control of the gas is not required (as, for example, when the gas is to be directly re-injected into the reservoir), the process displayed in FIG. 3 of the aforesaid article provides an efficient means of stabilizing the liquid product.

With more severe processing conditions, however, such as are described above for simultaneous crude shipment by tanker and gas shipment by pipeline, the processes described in the aforesaid article will be unable to meet both product specifications without either an excessive requirement for gas compression horsepower or the withdrawal of a third product from the platform. This third product derives from the light condensate which is removed from the gas in the dew point control section (e.g., by propane refrigeration).

The disposal of this third product stream presents a real and difficult problem in offshore operations since in known environments where this process would find application, the compositions of the inlet stream are such that the third product stream will normally be too light to add to the crude products and too heavy to efficiently burn as fuel. The methane/ethane/propane content of the third product stream will be so high that if it is "spiked back into the crude product" as suggested by the article, the resulting spiked crude will have a vapor pressure far in excess of what can presently be considered "stable" for shipment by tanker. One possible solution for this problem is to divert this third product stream to a stabilizing tower with the stabilized bottoms "spiked back into the crude product." Since the off-gas from the stabilizer must be recycled through the process, however, total compressor horsepower requirements would be increased to unrealistic levels. The compressor horsepower can be reduced only by withdrawal of at least a portion of the condensate from the process, most likely as a liquid from the stabilizer overhead.

Further, in a process such as shown in FIG. 3 of the article, there are no means for maintaining the final vapor pressure of the crude product at a substantially constant value when changes in composition, temperature, and/or pressure of the inlet stream occur. Since for known inlet streams, the pressure in the last stage of separation of the process will have to be quite close to ambient pressure to achieve desired crude stability, reduction in the last stage pressure as a means for controlling the vapor pressure is not considered practical. This will not normally be a problem when the only objective of the process is stabilization of the liquid product. When a low dew point gas is also required, however, the resulting increase in light components in the crude will cause the process to operate much closer to the vapor pressure limit acceptable for tanker shipment. Without adequate control, successful operation of the process in the face of expected variations from design conditions would be seriously impaired.

As can be seen from the above discussion, a process such as is shown in FIG. 3 of the above-mentioned article will not provide a satisfactory means of producing both a stable liquid product and a low dew point gas product. It would require substantial additional processing equipment for condensate stabilization, it would require the withdrawal of an unwanted third product from the platform, and it would be unable to achieve adequate control of the vapor pressure of the liquid product.

SUMMARY OF THE INVENTION

It is the purpose of the present invention described herein to provide a process and apparatus which will overcome all of these difficulties. The invention uses substantially the same process equipment as the aforesaid process, but by appropriate sequencing of liquid and vapor streams, it is able to produce both a stable liquid product and a low dew point gas product without the need to withdraw a third product, and within reasonable limits of platform horsepower availability. In addition, by selected heat exchange within the process, and a resulting increase in the pressure in the last stage of separation, it provides two independent control mechanisms for maintaining the desired degree of stabilization of the crude oil product.

Basically, the present invention has four separation stages through which the production stream passes. Each stage has a flash separator in which the production stream undergoes a further pressure reduction to separate additional gas products at each stage. The liquid products leaving the fourth separation stage have a desired, stabilized vapor pressure and form the liquid product stream which is supplied to a utilization source, e.g., pipeline, storage, etc.

Each separation stage also includes a gas scrubber which receives the gas products from its respective flash separator. In the present invention, it is the handling of the gas and especially the condensed liquid products from the gas scrubbers that provide for good fractionating efficiency with a minimum amount of equipment while staying within practical compressor horsepower requirements. By proper routing of the liquid and vapor streams including any "third product" streams within the system, the present process provides an efficient, controllable fractionator in addition to an efficient gas-compression device which requires no independent handling of "third product" streams as in the prior art.

This routing of products in the present invention provides a flow sequence of gas and liquid products which closely simulates the flow sequence of a conventional distillation tower and operates almost exactly the same except the principal driving force for vapor boil-up in the present invention is pressure drop rather than reboiler heat as in a conventional tower. With this flow sequence, the present invention provides for direct control of crude vapor pressure in a manner parallel but not identical to reboiler control in a conventional fractionator.

The effect of reboiler control in a conventional fractionator is to drive additional vapors (gas) up the column. In the present invention, additional vapors are driven from the final product in two ways: one by adding heat to the third separation stage and the other by pressure reduction in the fourth separation stage. Since all of the gas-liquids return to the inlet stream liquid of the third flash separator by way of its respective scrubber, heat can be added to the third flash separator by heating the liquid from said scrubber. Because of the relatively low temperature of this stream, the desired heat can normally be recovered from within the process or it can be added from an external source.

The importance of adding heat to this liquid should not be underestimated. The higher the temperature in the third flash separator, the lower the pressure drop has to be between third flash separator and fourth flash separator to maintain the desired vapor pressure of the final liquid product stream. As a result, it is possible to increase the pressure in the fourth flash separator which permits later reductions in this increased pressure as a means of maintaining a substantially constant vapor pressure for the crude products when the composition, temperature and/or pressure of the inlet stream changes. Also, this increased pressure in the fourth flash separator provides a corresponding reduction in the required vapor or gas circulation and the related compressor horsepower requirements for the process which is a very important consideration in processes of the present type.

BRIEF DESCRIPTION OF THE DRAWINGS

The actual construction, operation, and the apparent advantages of the invention will be better understood by referring to the drawings in which the numerals identify like parts and in which.

DESCRIPTION OF PREFERRED EMBODIMENT

Figure 1:
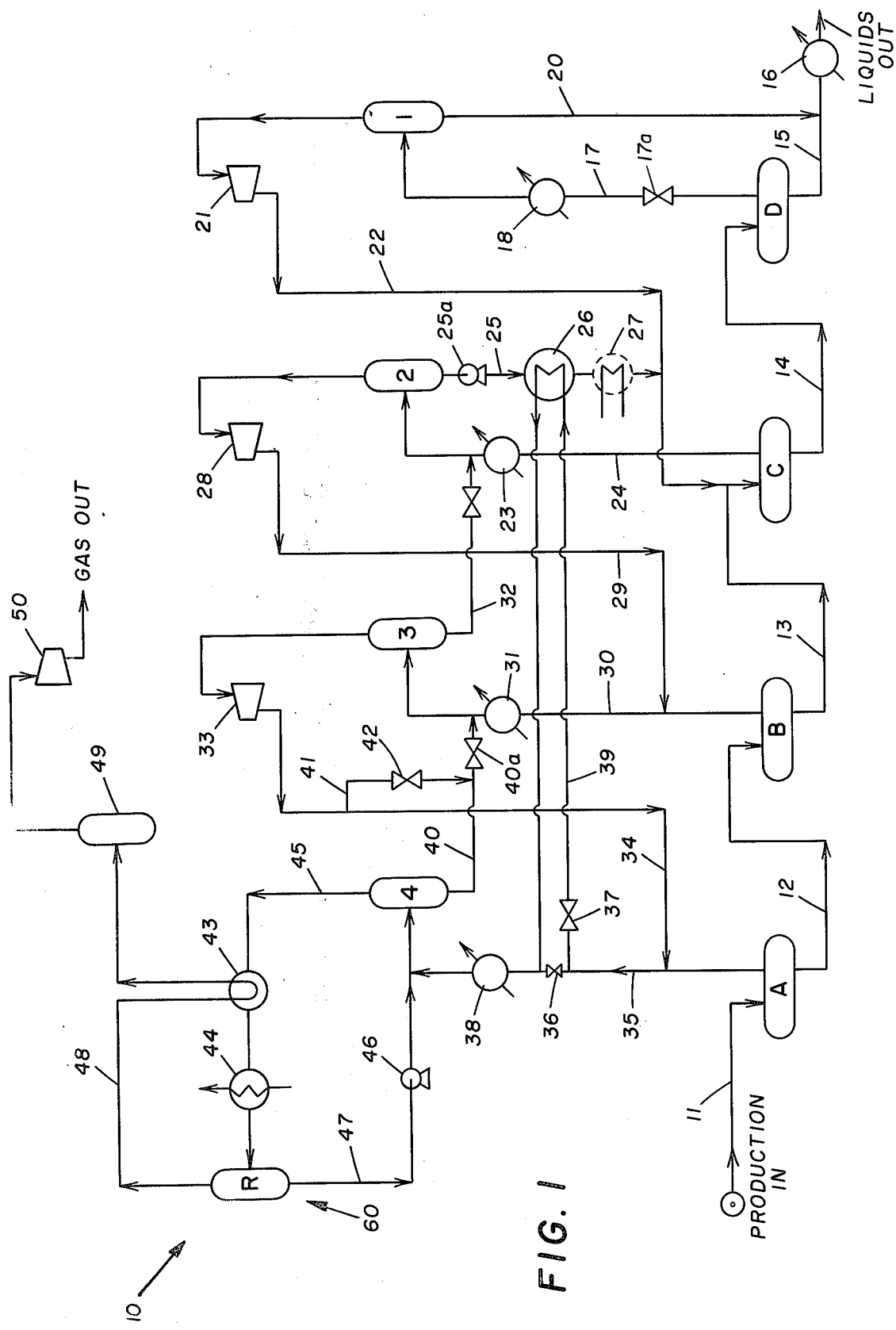
FIG. 1 is a schematic, flow diagram of the processing apparatus of the present invention.

Referring more particularly to the drawings, there is shown schematically processing apparatus or unit 10 which is especially adaptable for processing a petroleum production stream at a remote location, e.g., an offshore platform. Unit 10 is comprised of a plurality of flash separator stages (four shown) which are made up of flash separators A, B, C, D, and gas cooler separators or scrubbers 1, 2, 3, 4.

The production stream flows through inlet line 11 into flash separator A where the pressure of the stream is reduced, which allows gas to separate from the stream. The liquid from separator A flows through line 12 to flash separator B where a further pressure reduction separates additional gas from the liquid stream. The liquid stream continues on through line 13 to flash separator C and from separator C through line 14 to flash separator D and in each separator a further pressure reduction is effected to vaporize additional gas from the liquids.

The pressure reductions in the various stages are designed so that the liquids leaving separator D via liquid output line 15 are stabilized with a vapor pressure which satisfies predetermined requirements for safe storing and/or transportation of said liquids. Cooling means 16 is positioned in liquid output line 15 to cool the liquid products before further handling is necessary.

The handling of the gas from each of flash separators A, B, C, D and both the gas and the liquids from scrubbers 1, 2, 3, 4 in the present invention provides for good fractionating efficiency for the overall process and allows this to be done with a minimum amount of equipment and within practical compressor horsepower. Further, this is done in such a manner that there is no need to handle an independent third product stream. The flow sequency of the present invention, as it will be seen from the following discussion, comes very close to simulating the flow sequence of a conventional distillation tower and operates almost exactly the same except the principal driving force for vapor boil-up in the present invention is pressure drop between the last two flash separators C and D rather than reboiler heat as in a conventional tower. However, also as will be discussed below, heat can be added in the present process at a point analogous to that of the reboiler in a conventional distillation tower to provide an additional means of control of the final crude vapor pressure.

More specifically, gas from flash separator D flows through cooler 18 in line 17 to scrubber 1 where any liquid in the gas is condensed and returned to liquid product line 15 through line 20. Gas from scrubber 1 is compressed by compressor 21 and is returned to flash separator C via line 22. It is noted that this gas is not cooled so the heat of compression of this gas is added to flash separator C. At least a portion of this gas along with the gas from flash separator C flows through cooler 23 in line 24 to scrubber 2 in which liquids in said gas are condensed. Pump 25a pumps the liquids from scrubber 2 through two heat exchangers 26, 27 (purpose of which will be explained later) in line 25 and into line 22 to be returned to flash separator C.

The gas from scrubber 2 is compressed by compressor 28 and is flowed through line 29 to be combined with the gas from flash separator B, and this combined flow of gas flows through cooler 31 in line 30 to scrubber 3. Liquid condensed in scrubber 3 is passed through line 32 to be combined with gas in line 24 from separator C before it enters scrubber 2.

Gas from scrubber 3 is compressed by compressor 33 and flows through line 34 to be combined with the gas from flash separator A in line 35. With valve 36 open and valve 37 closed, the combined gas flows through cooler 38 to scrubber 4. With valve 36 closed and valve 37 open, the combined flow will pass through line 39 to heat exchanger 26 (purpose explained below) before passing through cooler 38 into scrubber 4. Liquid condensed in scrubber 4 is flowed to scrubber 3 via lines 40, 30. A bypass 41, controlled by valve 42, connects line 34 with line 40 for a purpose discussed below.

Gas from scrubber 4 passes through heat exchanger 43 and cooler 44 in line 45 and into refrigerated residue gas/liquid separator R which comprise the section or stage 60 of the process for producing the final gas product stream which has a stabilized, low dew point temperature. The residue gas from R having a stabilized low dew point flows via line 48 through heat exchanger 43 to precool the gas in line 45 and after passing through liquid knockout means 49 is compressed by compressor 50 for reinjecting into the petroleum producing formations or for injection into a pipeline for commercial sale or other use. The condensate or condensed liquids from refrigerated separator stage R is routed to scrubber 4 via line 47 by means of pump 46. By returning this condensate stream to scrubber 4 and by the previous specific routing of the various gas and liquid streams, all of the liquid products generated in the present process are retained and recycled within the process thereby eliminating the necessity of independently handling a third product stream.

Figure 2:
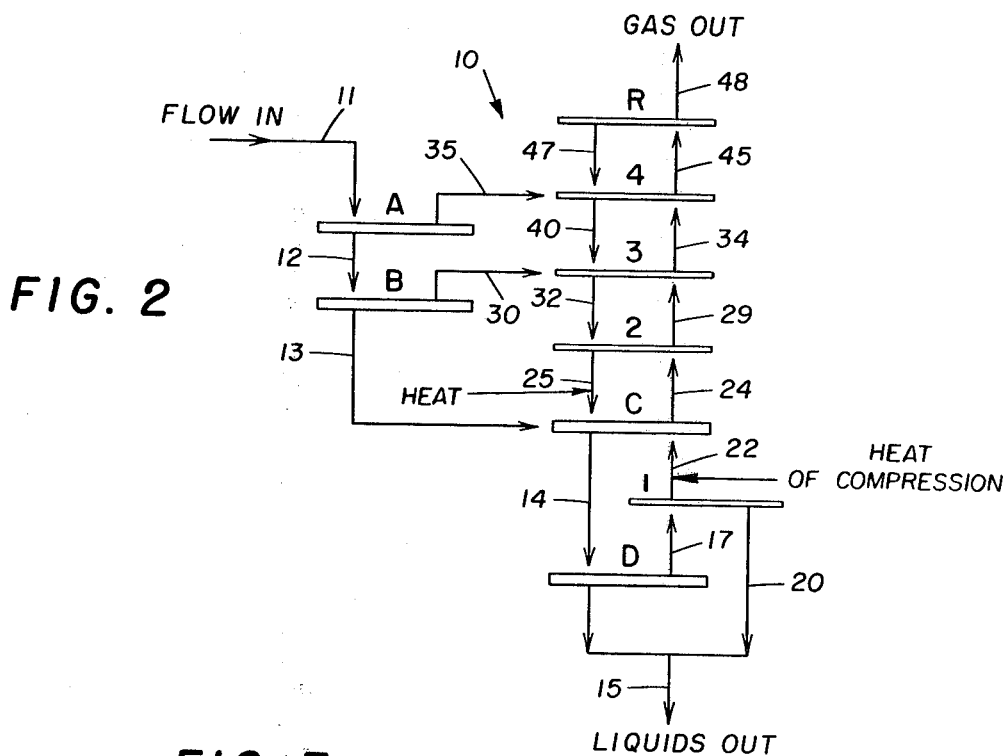
FIG. 2 is a schematic representation of the flow sequence of the present invention.

To better appreciate the specific sequence of the various gas and liquid flows and how said sequence closely simulates the flow through a conventional distillation tower, reference is made to FIG. 2 wherein the flow sequence has been schematically illustrated. As mentioned above, the present invention operates almost exactly like a conventional tower except the principal driving force for vapor boil-up is pressure drop between flash separator C and D rather than reboiler heat.

However, the present process provides means whereby heat, equivalent to reboiler heat can also be added as an additional control for maintaining the vapor pressure of the final crude products at a substantially constant value. The beneficial effect of such reboiler heat on fractionation is realized in the present invention as follows. Since all of the gas-condensed liquids except those from scrubber 1 eventually return to the inlet stream liquid in flash separator C by way of scrubber 2 (i.e., liquids from R to 4; from 4 to 3; and 3 to 2), heat can be added to separator C by heating the liquid in line 25 before it enters separator C. Because of the relatively low temperature of this stream, the desired heat can normally be recovered from within the process. As shown in FIG. 1 the combined hot gases from flash separator A and from the discharge of compressor 33 are circulated via line 39 through heat exchanger 26 where they give up heat to the liquid in line 25. Also, the heat from the compressed gas in line 22 from scrubber 1 is added to the liquid in line 25. If there is not sufficient heat available through line 39, external heat can always be added by way of hot oil exchange 27 or the like. As can be best seen in FIG. 2, the point at which the heat is added is near the "bottom" of the simulated column and hence this heat functions much in the same way as reboiler heat does in a conventional column.

The importance of adding heat to the liquid in line 25 should not be underestimated. The higher the temperature in separator C, the lower the pressure drop required between separators C and D to maintain the desired final vapor pressure of the liquid products. As a result, it is possible to increase the pressure in separator D and use the variance of this pressure as a means of controlling the vapor pressure of the final crude products. This control feature is important since the original composition, pressure, and/or temperature of the production stream entering through line 11 will likely vary during the operational life of the process which, in turn, necessitates some control flexibility in the process to compensate for such changes.

Further an increase in pressure in separator D produces a corresponding reduction in the amount of vapor or gas that will need to be circulated in the process thereby reducing the required compressor horsepower for the process. This pressure increase still further allows a pressure increase to be taken in the suction of compressor 21 thereby further reducing the compressor horsepower requirements of the process which is an important consideration in any offshore production process.

Added flexibility can be provided in the present process by taking a smaller pressure increase in the suction of compressor 21 than the pressure increase taken in separator D. This increases the pressure difference between compressor 21 and separator D and the added flexibility of the process now comes from being able to reduce the pressure in separator D by means of valve 17a as may become necessary due to changes in inlet stream conditions without affecting the pressure at the suction of compressor 21.

Figure 3:
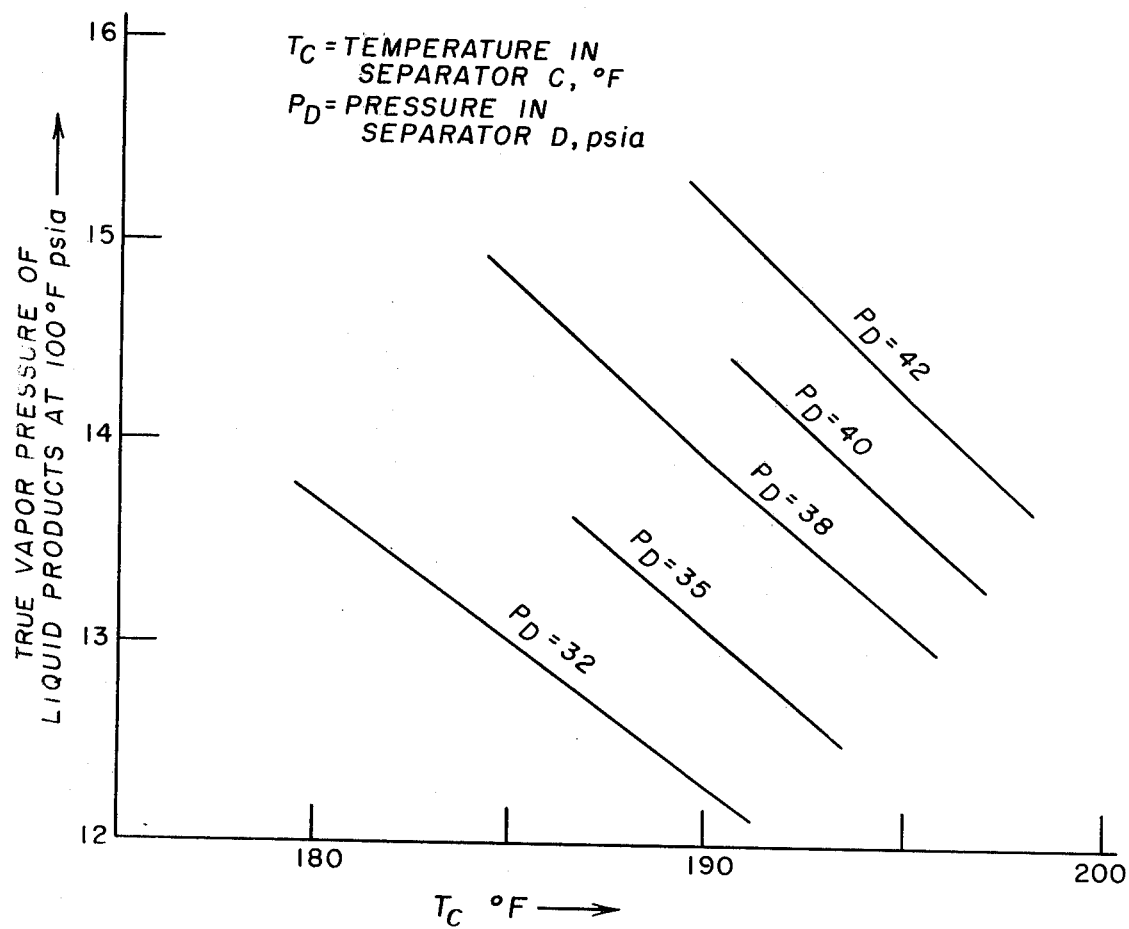
FIG. 3 is a graph depicting data from a typical example of a petroleum production stream illustrating certain relationships between vapor pressure, temperature, and pressure within certain components of the present invention.

Reference is made to FIG. 3 wherein the basic interrelationship between the temperature ($T_C$) in separator C and the pressure in separator D ($P_D$) is illustrated for a typical petroleum production stream from an offshore deposit. As discussed above, this interrelationship between $T_C$ and $P_D$ provides two separate means of maintaining liquid product vapor pressure at a substantially constant value even when conditions of the inlet stream change. For example, if the vapor pressure of the liquid products begins to rise, as may be due to changes in production stream composition, pressure, and/or temperature, $P_D$ can be decreased or $T_C$ can be increased to establish and maintain the desired liquid vapor pressure at a substantially constant value.

As mentioned above, refrigerated separator stage R is used to control the dew point of the gas product stream which is important where the gas is to be transported through a sales gas pipeline or the like. If the gas products are to be used for some other purpose, e.g., reinjection for pressure maintenance in the producing formations, it may be desirable to eliminate separator R since to do so would make the liquid vapor pressure easier to control since $P_D$ could be increased by a greater amount. It should be noted that even without separator R, the control features of the present process still are functional to control the final vapor pressure of the liquid products.

With separator R present in the system, as disclosed, the cascading of liquids from separator R to scrubber 4, 3, and 2 serves to lower the temperatures in these scrubbers. While such a temperature reduction reduces the compressor horsepower requirements for the system, it also tends to increase the possibility of hydrate formation, particularly in the liquid in line 40 from scrubber 4 downstream of pressure reduction valve 40a. However, this should not normally create any substantial problem since the cold liquid in line 40 immediately joins the warmer gas in line 30 which normally will dissolve the hydrates. If any hydrates do stick to valve 40a and/or the associated piping, electrical tape (not shown) can be used to heat these areas or heat from a small amount of hot discharge vapor from compressor 33 can be supplied to line 40 through bypass 41 by opening valve 42.

What is claimed is:

1. A method of processing a petroleum production stream to produce a liquid product having a stabilized vapor pressure, said method comprising:

passing the production stream into a first separation stage having a first pressure to separate first gas products from liquid products in said production stream;

passing said liquid products from said first separation stage to a second separation stage having a second pressure lower than said first pressure to separate second gas products from said liquid products remaining in said production stream;

passing said liquid products from said second separation stage to a third separation stage having a third pressure lower than said second pressure to separate third gas products from said liquid products remaining in said production stream;

passing said liquid products from said third separation stage to a fourth separation stage having a fourth pressure lower than said third pressure to separate fourth gas products from said liquid products remaining in said production stream;

passing said liquid products now having a stabilized vapor pressure from said fourth separation stage to a utilization source;

passing said fourth gas products from said fourth separation stage to a first gas separator to condense first condensed liquid products from said fourth gas products;

passing the gas products from said first gas separator back to said third separation stage;

passing the gas products from said third separation stage to a second gas separator to condense second condensed liquid products from said gas products;

returning said second condensed liquid products from said second gas separator to said third separation stage; and controlling said stabilized vapor pressure of said liquid products leaving said fourth separation stage by controlling both (1) the temperature at which said liquid products leave said third separation stage by supplying heat to said second condensed liquid products before said products enter said third separation stage and (2) the pressure in said fourth separation stage.

2. The method of claim 1 wherein heat is at least partially supplied to said second condensed liquid by compressing said gas products from said first gas separator before they are passed back to said third separation stage.

3. The method of claim 1 wherein said heat is at least partially supplied to said second condensed liquids by heat exchanging said second condensed liquids with said first gas products.

4. The method of claim 1 wherein said heat is at least partially supplied to said second condensed liquids from an external heat source.

5. The method of claim 1 further providing a gas product having a stabilized low dew point, including:

passing the gas products from said second gas separator and said second gas products from said second separation stage to a third gas separator to condense third condensed liquid products from said gas products;

returning said third condensed liquid products to said second gas separator;

passing the gas products from said third gas separator and said first gas products from said first separation stage to a fourth gas separator to condense fourth condensed liquid products from said gas products;

returning said fourth condensed liquid products to said third gas separator;

passing the gas products from said fourth gas separator to a refrigerated separator stage to condense fifth condensed liquid products;

returning said fifth condensed liquid products to said fourth gas separator; and passing the gas products having a stabilized low dew point temperature from said refrigerated separator stage to a utilization source.

6. The method of claim 5 including:

heat exchanging the gas products from said refrigerated gas separator stage and said gas products from said fourth gas separator before said gas products from said fourth gas separator enter said refrigerated gas separator stage.

7. The method of claim 6 wherein said heat is supplied to said second condensed liquids by heat exchanging said second condensed liquids with the combined gas products from said third gas separator and said first gas products.

8. The method of claim 6 wherein said heat is supplied to said second condensed liquids from an external heat source.

* * * * *